United States Patent [19]
Sasaki et al.

[11] 3,931,083
[45] Jan. 6, 1976

[54] WATER-REDUCING ADMIXTURES FOR CERAMIC PASTES

[75] Inventors: Isamu Sasaki, Tokyo; Iwao Kojima; Fujio Namigata, both of Yokohama; Yoku Ishigame; Hiroshi Mihara, both of Kawasaki, all of Japan

[73] Assignee: Showa Denko Kabushiki Kaisha, Tokyo, Japan

[22] Filed: Jan. 30, 1974

[21] Appl. No.: 437,934

[30] Foreign Application Priority Data
Feb. 6, 1973   Japan................................. 48-14243
Oct. 6, 1973   Japan.............................. 48-111941

[52] U.S. Cl. .................. 260/29.3; 106/89; 106/90; 260/29.2 R; 260/49; 260/505 R
[51] Int. Cl.² ......................... C04B 7/02; C08G 8/18
[58] Field of Search ..... 106/89, 90; 260/49, 29.2 R, 260/29.3, 619, 505 R

[56] References Cited
UNITED STATES PATENTS

| | | | |
|---|---|---|---|
| 3,677,979 | 7/1972 | Beaulieu | 260/2.2 |
| 3,687,603 | 8/1972 | Abel et al. | 18/23 |

*Primary Examiner*—Lester L. Lee
*Attorney, Agent, or Firm*—Kemon, Palmer & Estabrook

[57] ABSTRACT

Water-reducing additives for ceramic material, and especially for cement paste, mortar or concrete, which comprise a phenolic compound having a sulfo radical or a sulfomethyl radical, wherein the hydrogen atoms of acidic radicals in part of said phenolic compound molecules are substituted by atoms of sodium, potassium or calcium.

7 Claims, No Drawings

WATER-REDUCING ADMIXTURES FOR CERAMIC PASTES

This invention relates to water-reducing additives for ceramic materials, and especially for cement paste, mortar or concrete (see ASTM Designation: C494-71).

Concrete products which are used on the largest industrial scale among ceramic products are prepared by kneading a mixture of cement, sand and gravel bearing proportions respectively falling within certain standard ranges with addition of a proper amount of water to disperse the ingredients uniformly, pouring a fresh concrete thus obtained into a form and hardening the mass at an atmospheric temperature. In this case, the compressive strength of the concrete products generally bears an inverse proportion to the water-cement ratio falling within a proper range, and the smaller the water-cement ratio, the higher the compressive strength of the product. If, however, the fresh concrete contains an excessively small amount of water, then it will become less workable.

As for paste of gypsum or cement, clay for manufacture of these products such as pre-fabricated building materials, pottery or refractory, there are also similar problems, namely, these are produced by mixing the required proportions of ingredients with water, followed by kneading, shaping, drying and calcining or hardening. If, in this case, the kneaded paste contains a relatively small amount of water, the shaped article will be easily released from the mold, saved from deformation and moreover take less time of drying, namely, the raw paste will have improved workability as generally desired. If, however, the water content of the paste is unduly small, the ingredients will not be homogeneously kneaded, failing not only to provide good quality product but also to attain the proper shaping of product.

To date, alkylarylsulfonates, such as a condensation product of sodium naphthalinesulfonate with formaldehyde (see Japanese Patent Publication No. 11737/1966), have been developed and already put to practical use with the view of reducing the water content of pastes of ceramic products as much as possible and carrying out the good dispersion of ingredients. Unlike the known air entraining agent, such as resin and calcium lignosulfonate, these water-reducing additives cause the mechanical strength and the workability of ceramic products to be exceedingly increased without entraining air, simply by being added to the paste in a very small amount.

The object of this invention is to provide water-reducing additives having a far higher property than the aforesaid alkylaryl sulfonates, namely, capable of more increasing the workability with a smaller water content and rendering the ceramic product mechanically stronger than that prepared by addition of said alkylaryl sulfonates.

Another object of this invention is to offer concrete products having a particularly great early days strength.

These objects can be attained in accordance with this invention by mixing ceramic pastes with an additive soluble in the water contained in said pastes which comprises a phenol derivative having at least one member of sulfo radical and sulfomethyl radical, wherein the hydrogen atoms of acidic radicals in part of said phenol derivative molecules contained in the additive are substituted by atoms of sodium, potassium or calcium. Instead of the above-mentioned phenol derivative, a primary condensation product of formaldehyde and a similar phenol derivative, etc., can also be employed.

The above-mentioned compounds used as a novel water-reducing additive are easily prepared by any customary method. Usually, the compounds are prepared in a state of water solution, whose pH value being controlled to be in the range of from 7 to 10. Such solution as mentioned above can be used as itself. Sometimes, however, powders of the compounds obtained from the solution can also be used. Upon using of this additive for ceramic paste, 20% aqueous solution thereof may be preferably employed.

The amount of the present additive to be used for concrete is not limited strictly, but, in general, the additive is added in proportions ranging from 0.1 to 2.0 percent by weight, or preferably from 0.5 to 1.0 percent by weight based on the weight of cement included in the concrete.

The additives of this invention are adapted not only for mortar and concrete, but also for other ceramic materials such as gypsum, cement paste, clay for manufacture of pre-fabricated building, pottery or refractory, etc., to exhibit substantially the similar effects as mentioned before.

This invention will be more clearly understood by reference to the following experiments as well as comparative data obtained by using Portland cement. Unit weight of Poltland cement used in the concrete sample was 300 Kg/m³, and the maximum size of the gravel mixed therewith was 25 mm.

The slump and the compressive strength of concrete were measured in accordance with the ASTM Designations: C-143 and C-39 respectively. Comparative experiments were carried out with a plain concrete free from any water-reducing additive and a concrete containing a commercially available water-reducing additive of alkylaryl sulfonate.

Preparation of additives:

No. 1 A one-liter three necked flask provided with a stirrer and a reflux condenser was charged with 94g of phenol, 81g of 37% formalin, 126g of sodium sulfite and 300g of water. Reaction was conducted for 5 hours under heating by a boiling water bath to obtain a water solution of sodium hydroxybenzylsulfonate. The concentration of the solution thus obtained was about 40% by weight, and the pH value thereof was 11.5. This solution was used as a water-reducing additive designated as A.

The chemical formulae of mixed compounds contained in A were as follows.

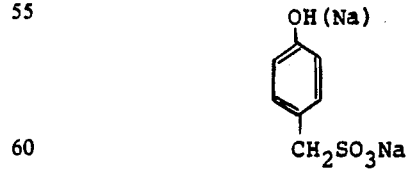

No. 2 Eighty one grams of 37% formalin were added to the solution which was obtained by means of the same method as described in No. 1. The mixed solution had its pH controlled to 9.7 by addition of 30% sulfuric acid solution. Reaction was carried out for 5 hours on a boiling water bath to obtain a water-soluble condensation product. The product was used as a water-reducing additive designated as B. The chemical formulae of mixed compounds contained in B were as follows.

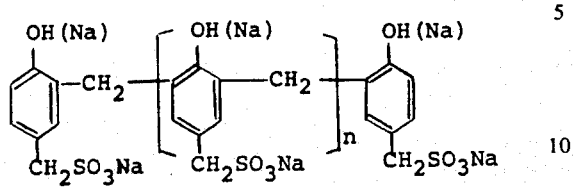

No. 3 Byproduct sodium sulfate was removed from the reaction product obtained by the same method as described in No. 2 by means of utilizing the lower solubility of said sodium sulfate. A water solution of condensation product thus purified was used as a water-reducing additive designated as C.

No. 4 The same type of reactor as used in the process No. 1 was charged with 94g of phenol, 81g of 37% formalin, 63g of sodium sulfite, 52g of sodium bisulfite and 300g of water. Reaction was conducted for 5 hours under heating by a boiling water bath. Reaction was continued for five more hours after adding 81g of 37% formalin to the mixture to obtain a condensation product having similar compounds as described in No. 2. The product was used as a water-reducing additive designated as D.

No. 5 The same type of reactor as used in the process No. 1 was charged with 94g of phenol, 162 g of 37% formalin, 63g of sodium sulfite and 300g of water. Reaction was conducted for 10 hours under heating by a boiling water bath to obtain a condensation product. The product was used as a water-reducing additive designated as E. The chemical formulae of mixed compounds contained in E were as follows.

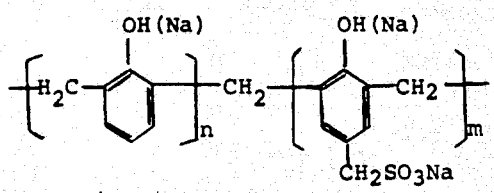

No. 6 First, phenolsulfonic acid was prepared from phenol and concentrated sulfuric acid by a customary method. One mol of said phenolsulfonic acid had its pH controlled to 9.5 by addition of 48% sodium hydroxide aqueous solution, and 81g of 37% formalin were further added to the mixed mass. Reaction was carried out for 5 hours on a boiling water bath to obtain a condensation product. The product was used as a water-reducing additive designated as F. The chemical formulae of mixed compounds contained in F were as follows.

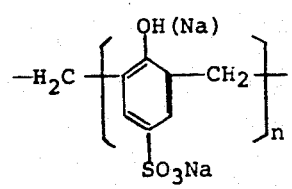

Concrete tests:

There were provided 20% aqueous solutions of the water-reducing additives A, B, C, D, E and F obtained by the processes Nos. 1 to 6 respectively. Each of said 20% aqueous solutions was added to the pastes of the respective Portland cement concrete samples in an amount of 0.25 to 0.50 percent by weight based on the amount of concrete as an active ingredient. The characteristics of the respective samples are presented in Table 1. Further, Table 2 sets forth percentage water reduction in each sample calculated from the following formula.

$$\frac{W_p - W_a}{W_p} \times 100$$

where Wp and Wa denote the amount of water contained in the plain concrete and admixed concrete respectively. Furthermore, the different compressive strengths of the respective concrete samples after 3, 7 and 28 days are also described in Table 2.

By way of comparison, both Tables 1 and 2 also present data of tests on a concrete sample free from a water-reducing additive and a concrete sample containing a commercially available water-reducing additive of alkylaryl sulfonate. Both Tables 1 and 2 further show data of tests on a concrete sample containing a known water-reducing additive of a melamine system similar to those of this invention which comprises a primary condensation product of melamine and formaldehyde whose molecule contains a sodium sulfo radical (see Japanese Patent Publication No. 21659/1968).

As apparent from Table 2, the additives of this invention attained a larger percentage water reduction in the concrete samples and a higher compressive strength in said concrete samples than the prior art or commercially available water-reducing additive.

Table 1

| Test No. | Additive and amount thereof (wt. % to cement in the concrete) | Results of fresh concrete tests | | | | |
|---|---|---|---|---|---|---|
| | | Amount of water (Kg/m³) | Water-cement ratio (%) | Sand percentage s/a (%) | Slump (cm) | Air content (%) |
| 1 | No additive | 189 | 63.0 | 40.0 | 18.2 | 0.8 |
| 2 | Commercially available additive 0.60 | 176 | 58.7 | 40.0 | 17.8 | 1.2 |
| 3 | A 0.25 | 177 | 59.0 | 40.4 | 15.7 | 0.6 |
| 4 | B 0.25 | 170 | 56.7 | 41.6 | 18.3 | 0.8 |
| 5 | B 0.50 | 167 | 55.7 | 41.8 | 18.8 | 0.6 |
| 6 | C 0.25 | 170 | 56.7 | 41.6 | 17.5 | 0.5 |
| 7 | D 0.25 | 172 | 57.3 | 41.6 | 17.3 | 0.6 |
| 8 | E 0.25 | 173 | 57.7 | 40.4 | 18.3 | 0.8 |

Table 1-continued

| Test No. | Additive and amount thereof (wt. % to cement in the concrete | Results of fresh concrete tests Amount of water (Kg/m³) | Water-cement ratio (%) | Sand percentage s/a (%) | Slump (cm) | Air content (%) |
|---|---|---|---|---|---|---|
| 9 | F 0.25 | 172 | 57.3 | 40.4 | 17.2 | 1.0 |
| 10 | Melamine-system 0.50 | 174 | 58.0 | 41.2 | 17.8 | 1.0 |

Table 2

| Test No. | Percentage water reduction | Results of strength tests Compressive strength (Kg/cm²) (strength ratio) | | |
|---|---|---|---|---|
| | | 3 days | 7 days | 28 days |
| 1 | — | 102 (100) | 178 (100) | 296 (100) |
| 2 | 6.9 | 128 (125) | 205 (115) | 317 (107) |
| 3 | 6.3 | 168 (165) | 279 (157) | 441 (149) |
| 4 | 10.1 | 145 (142) | 240 (135) | 370 (125) |
| 5 | 11.6 | 189 (185) | 296 (166) | 398 (134) |
| 6 | 10.1 | 169 (166) | 281 (159) | 382 (129) |
| 7 | 9.0 | 155 (152) | 261 (147) | 385 (130) |
| 8 | 8.5 | 141 (138) | 248 (139) | 403 (136) |
| 9 | 9.0 | 149 (146) | 263 (148) | 398 (134) |
| 10 | 8.0 | 158 (155) | 263 (148) | 371 (125) |

Referring to Table 2, the percentage water reduction of test No. 3 was slightly smaller than that of test No. 2. The reason is that the additive in test No. 3 was applied in a far smaller amount than that in test No. 2. If, however, the additive in test No. 3 had been used in a large amount like that in test No. 2, then the former additives should have attained a far higher percentage water reduction than the latter.

Further, we have developed another water-reducing additive modified from those of this invention. This modified water-reducing additive for ceramic materials, particularly mortar and concrete, comprises a primary copolycondensation product of formaldehyde, melamine and phenol having at least one member of sulfo radical and sulfomethyl radical, wherein the hydrogen atoms of acidic radicals in part of said molecules contained in the additive are substituted by atoms of sodium, potassium or calcium. The modified additive is to be soluble in the water contained in the paste. The moral ratio of melamine to phenol in the molecule is in the range of from 40:60 to 90:10, and this additive is added to the paste in the same proportion as the original additive of this invention.

The modified additive can also be manufactured by any customary process. The manufacturing process consists in, for instance, preparing a prepolymer from a mixture of phenol, melamine and formalin, and subjecting the prepolymer obtained to sulfonation or sulfomethylation using sodium sulfite or sodium bisulfite, followed by neutralization with an alkaline substance.

The modified additive has a peculiar property of causing a concrete product to display a very high few hours strength. In contrast, the original additives of this invention provide a rather lower few hours strength for a concrete product than when the product is free from any such additives, though the product containing said additive prominently increases in the early days and 28 days strength.

Recently, large quantities of prefabricated concrete products are rapidly manufactured in a factory, so that a high few hours strength is demanded for the products. Therefore, the above-mentioned modified additive will undoubtedly meet this request.

The early days and 28 days strengths of concrete products using this modified additive are higher than those of products using alkylaryl sulfonates or a known water-reducing additive of melamine-system. However, 28 days strength of concrete products containing this modified additive is almost the same as that of products using the original additives of this invention. The original and modified additives correspond to "Water-reducing and retarding additive" and "Water-reducing and accelerating additive" respectively which are stated in ASTM Designation:C494-71.

The aforesaid peculiar property of the modified additive is originated with the copolycondensation of phenol, melamine and formaldehyde. Therefore, an additive which comprises a mere mixture of an original additive of this invention, that is, a phenol-system, and an additive of melamine system can not play such a peculiar role as is displayed by the modified additive.

The property of the modified additive of this invention will be more clearly understood by reference to the undermentioned experiments as well as comparative experiments.

Preparation of modified admixtures:

No. 7 A 2-liter four necked flask provided with a stirrer, a reflux condenser and a thermometer was charged with 228g (1.8 mols) of melamine, 19g (0.2 mol) of phenol and 595g of 37% formalin. The flask was immersed in a hot water bath of 80°C for reaction. Having been kept alone for 10 minutes after the reaction liquid became transparent, said liquid was cooled to 50°C. Thereafter, the flask was further charged with 102g of sodium sulfite, 125g of sodium bisulfite and 300g of water. The flask was again immersed in a hot water bath of 80°C, and reaction was carried out for 2 hours. The charged mass was cooled to 50°C and 30% sulfuric acid was added thereinto to control the pH of the reaction liquid to 4.5. Reaction was further conducted for five more hours under heating at 50°C by the hot water bath.

Finally, the liquid in the flask had its pH controlled to 9.5 by 48% sodium hydroxide aqueous solution. The reaction product thus obtained was used as a water-reducing additive designated as G.

No. 8 A water-reducing additive, designated as H, was prepared by reacting 176g (1.4 mols) of melamine, 57g (0.6 mol) of phenol, 550g of 37% formalin, 102g of sodium sulfite, 125g of sodium bisulfite and 300g of water in the same manner as mentioned in No. 7.

No. 9 A water-reducing additive, designated as I, was prepared by reacting 126g (1 mol) of melamine, 94g (1 mol) of phenol, 446g of 37% formalin, 102g of sodium sulfite, 125g of sodium bisulfite and 300g of water in the same manner as mentioned in No. 7.

Concrete tests:

There were prepared 20% aqueous solutions of the modified additives G, H and I respectively. Each of these solutions was added to the pastes of the respective concrete samples in an amount of 0.5 percent by weight as the active ingredients based on the weight of cement included in the concrete. The characteristics of the concrete samples are presented in Table 3. The sand percentage of s/a of all concrete samples is 40%. After having left each concrete sample to stand for 3 hours under an atmospheric temperature of about 20°C, the concrete sample was cured at 65°C by steam for 1, 2 and 3 hours, and then the compressive strengths (few hour strengths) of each sample were measured respectively. One day and 28 days strengths were measured after holding the sample cured by steam for 3 hours as mentioned above to stand for required period under an atmospheric or in a water bath kept at 20°C. Table 4 indicates the percentage water reduction in the samples and a few hours and 1 and 28 days strengths.

By way of comparison, both Tables 3 and 4 also set forth data of tests on a plain concrete and other concretes containing a commercially available additive of alkylaryl sulfonate and an additive of a melamine-system, and furthermore an original additive of this invention (phenol-system) and an additive consisting of a mere mixture of a melamine-system and a phenol-system.

Table 3

| Test No. | Additive and amount thereof (wt. % to cement in the concrete | Results of fresh concrete tests | | | | |
|---|---|---|---|---|---|---|
| | | Slump cm | Mixing ratio of materials Kg/m³ | | | |
| | | | Cement | Water | Sand | Gravel |
| 11 | (Plain) — | 5.0 | 300 | 170 | 729 | 1171 |
| 12 | G      0.5 | 5.0 | 300 | 153 | 744 | 1199 |
| 13 | H      0.5 | 4.7 | 300 | 153 | 744 | 1199 |
| 14 | I      0.5 | 4.7 | 300 | 156 | 741 | 1194 |
| 15 | Commercially available    0.6 | 5.2 | 300 | 158 | 738 | 1190 |
| 16 | Melamine-system    0.5 | 4.8 | 300 | 158 | 738 | 1190 |
| 17 | Original of this invention    0.5 | 5.0 | 300 | 147 | 773 | 1209 |
| 18 | Melamine-system   0.35 + Original of this invention   0.15 | 4.8 | 300 | 156 | 741 | 1194 |

Table 4

| Test No. | Percentage water reduction (%) | Results of strength tests Compressive strength (kg/cm²) | | | | |
|---|---|---|---|---|---|---|
| | | 1 hour | 2 hours | 3 hours | 1 day | 28 days |
| 11 | — | 33.3 | 62.4 | 81.2 | 127 | 301 |
| 12 | 10.0 | 58.4 | 81.7 | 120 | 190 | 358 |
| 13 | 10.0 | 59.1 | 92.3 | 120 | 188 | 361 |
| 14 | 8.2 | 50.4 | 84.1 | 110 | 177 | 365 |
| 15 | 7.1 | 45.8 | 80.5 | 105 | 156 | 340 |
| 16 | 7.1 | 46.6 | 88.6 | 113 | 167 | 348 |
| 17 | 13.5 | 23.5 | 44.8 | 61.4 | 97.7 | 364 |
| 18 | 8.2 | 45.8 | 80.3 | 103 | 170 | 357 |

What we claim is:

1. A ceramic paste comprising a hydraulic cement, water and as a water-reducing additive between about 0.1 to 2.0% by weight based on the weight of said cement, of phenol substituted with at least one member selected from the group consisting of sulfo radical and sulfomethyl radical, wherein the hydrogen atoms of acidic radicals in part of said phenol compound are substituted by atoms selected from the group consisting of sodium, potassium and calcium.

2. The ceramic paste of claim 1 which is concrete comprising portland cement, sand, gravel and water.

3. The ceramic paste of claim 1 which is mortar comprising portland cement, sand and water.

4. A ceramic paste comprising hydraulic cement, water and as a water-reducing additive between about 0.1 to 2.0% by weight based on the weight of said cement of a water-soluble primary condensation product of formaldehyde and a phenol derivative having at least one member selected from the group consisting of sulfo radical and sulfomethyl radical, wherein the hydrogen atoms of acidic radicals in part of said condensation product are substituted by atoms selected from the group consisting of sodium, potassium and calcium.

5. The ceramic paste of claim 4 wherein the amount of additive is between about 0.5 to 1% by weight based on the weight of cement in the paste.

6. The Ceramic paste of claim 4 which is concrete comprising portland cement, sand gravel and water.

7. The ceramic paste of claim 4 which is mortar comprising portland cement, sand and water.

* * * * *